United States Patent Office 3,125,163
Patented Mar. 17, 1964

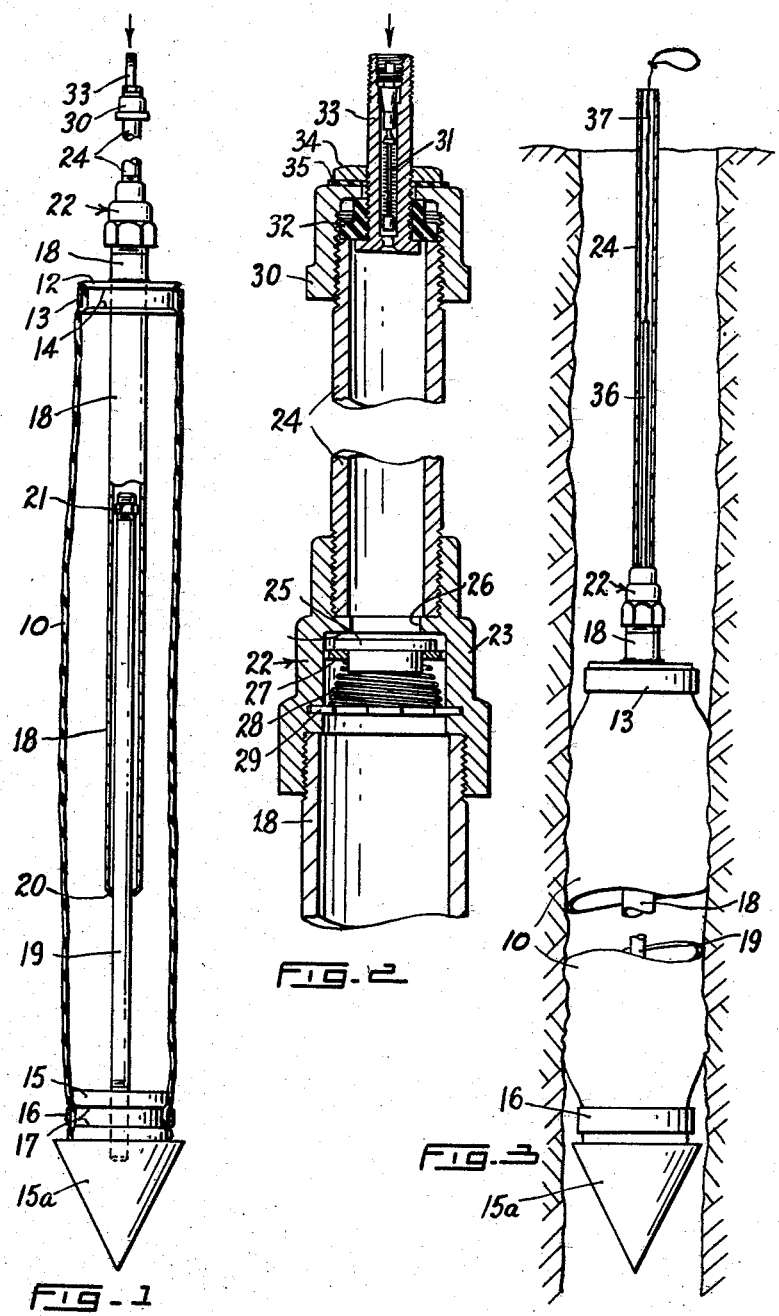

3,125,163
INFLATABLE EXPANSION PLUG
Walter Gordon Smith, 8803 65th Ave., Edmonton,
Alberta, Canada
Filed Mar. 26, 1962, Ser. No. 182,328
5 Claims. (Cl. 166—187)

This invention relates to an inflatable expansion plug adapted to temporarily seal off a bore hole or to prevent the flow or migration of liquids and/or gases from beyond any desired point within a hole bore. A specific use of such an expansion plug is in sealing geophysical test or shot holes which normally have a depth of the order of 100 feet, and a diameter ranging from about 3½ inches to more than 10 inches.

Expansion type plugs at present in use are too complicated for easy manufacture and installation and as a result are too costly. Their expansion qualities are very limited and they have an excessive number of intricate working parts. By and large the conventional types of expansion plugs require a smooth hole bore with solid rock walls or a cased wall in order to be operative.

The invention consists essentially in securing an inflatable tube between upper and lower members with a steady rod secured axially to the lower member and slidable in a pipe projecting downwards from the upper member, with provision to feed air through the pipe and into the inflatable tube, and valve means for admitting air to the inflatable tube and controllable from above ground to effect exhaust of air from the inflatable tube for the purpose of adjusting the position of the inflatable tube within the hole bore.

It is an object of the present invention to provide an inflatable expansion plug which is of simple construction and can therefore be manufactured at minimum cost.

It is another object of the present invention to provide a plug with maximum even distribution of the internal pressure against the hole bore so as to obtain an effective seal.

It is a further object of the invention to provide a plug which is easy and convenient to install or remove and which can readily be adjusted in the depth of the hole bore.

It is yet another object of the invention to provide an expansion plug which is durable and in which the parts subject to wear are capable of easy replacement.

With these and other objects in view, the inflatable expansion plug according to this invention features a conductor pipe which enables the plug to be inserted into a hole bore to any desired depth, and an inflatable sleeve which is provided with means to keep it generally straight while allowing it to expand not only radially, but to a limited axial extent.

Further objects and features of the present invention will become apparent from the ensuing description of a preferred embodiment, illustrated by way of example in the accompanying drawings, in which:

FIG. 1 is a vertical axial section of the inflatable expansion plug.

FIG. 2 is a fragmentary axial section showing details of the valves which are included in the construction.

FIG. 3 is a fragmentary elevation, partly in section, showing the plug in expanded condition and showing means to relieve the inflation pressure.

Referring to the drawings, the inflatable plug consists of a sealed sleeve 10 of rubber or other elastic material which is expandable upon inflation both in longitudinal and radial directions and which, when inflated, conforms to the uneven wall surface of the hole bore 11 (FIG. 3) for a substantial portion of its length, so as to provide an effective seal against flow or migration of liquids and/or gases either into or out of the hole bore.

The sleeve 10 is secured at its upper end to a flange member 12 by the annular clamp 13 in the peripheral groove 14 and at its lower end to the flange member 15 by the annular clamp 16 in the peripheral groove 17.

Secured axially to the upper flange member 12 is a pipe 18 projecting a short distance above the upper flange member 12 and projecting downwards a substantial length of the inflatable tube 10. A guide rod 19 is axially mounted in the lower flange member 15 and projects upwards and into the bore of the pipe 18. The internal diameter of the pipe 18 is such as to provide a substantial clearance around the guide rod 19 and has its lower end crimped at 20. The crimped end 20 of the pipe 18 provides sufficient clearance for the passage of air to and from the inflatable tube. A nut 21 threaded on to the top end of the rod 19 prevents separation of the rod from the pipe 18. The conical end 15a of the flange 15 permits the plug to force its way through or past obstructions in the hole bore 11.

Secured to the upper end of the pipe 18 above the flange member 12 is a valve structure 22. This valve structure 22 consists of a sleeve 23 threaded at its lower end to the pipe 18 and at its upper end to the air conductor pipe 24. An air valve 25 is seated against the apertured flange 26 within the sleeve 23 and is axially guided by the guide plate 27. A spring 28 located between a backing plate 29 and the valve 25 holds the valve 25 in sealing engagement with the apertured flange 26.

The air conductor pipe 24 extends upwards in suitable coupled lengths to above ground level where it is capped by the fitting 30. A standard type tire air valve 31 is fitted in the cap fitting 30 and a packing gland 32 is located about the tire valve stem 33 between the end of the pipe 24 and the cap fitting 30. A nut 34 and washer 35 secure the valve stem 33 in place. An air hose, not shown can be fitted to the threaded stem 33 of the tire valve and air under pressure entering the pipe 24 will force the valve 25 off its seat permitting the air to pass down the pipe 18 and thence into the sleeve 10 to inflate the same and force it to expand into contact with the surface 11 of the hole bore.

When there is occasion to relocate the inflatable plug in the hole bore, either up or down, the cap fitting 30 together with its tire valve 31 are removed. A weight in the form of a rod 36, attached to the end of a cord 37, is then lowered down the pipe 24 into contact with the valve 25. By bouncing the weight rod 36 up and down, sufficient air can be bled from the sleeve 10 to permit the sleeve to be deflated sufficient to clear the sides of the hole bore 11 and have the position of the plug adjusted.

While the inflatable plug is primarily used as a temporary seal or a hole bore, it can also be used as a permanent plug by first removing the conductor pipe 24 by unscrewing it from the valve structure sleeve 23, and then filling the hole above the plug with cement.

The sleeve 10, being of rubber or other elastic like material may become damaged by cutting against rough edges on the surface of the hole bore 11. It is a simple matter to replace the sleeve by removing the clamps 13 and 16 and fitting a new sleeve to the apparatus at very little cost, thereby permitting the apparatus to be used over and over again.

In the operation of the device, the deflated plug is lowered into the hole bore to the required depth, fitting extra lengths of the conductor pipe 24 as required. The pipe 24 is then capped with the tire valve 31 and an air hose is then connected. Air pressure opens the tire valve 31 and the valve 25, inflating the plug until it seals tightly against the surface of the hole bore. Depending upon the diameter of the hole bore, there will be a degree of adjustment of the distance between the end flanges 12 and 15. This adjustment is accommodated by axial sliding of the guide rod 19 within the tube 18 while, at the same time, keeping the end flanges in axial alignment.

Should it be necessary to adjust the position of the plug in the hole bore, it is a simple matter to remove the tire valve 31, located above ground level, and to open the valve 25 by means of the rod and thereby deflate the plug sufficient to be able to move it up or down in the hole bore, as required. The valve 31 can then be replaced and the plug inflated in its new position.

What I claim is:

1. A pneumatic inflatable expansion plug for sealing off a hole bore at any point thereof comprising a conductor pipe connected at its upper end to a source of pneumatic pressure fluid, a supply pipe threadingly connected in axial alignment to the lower end of said conductor pipe, a one-way valve located at the joint between said conductor pipe and said supply pipe, the said valve being movable in an axial direction to permit a flow of pneumatic pressure fluid from said conductor pipe into said supply pipe, a first flange secured about said supply pipe, a guide rod slidably mounted in said supply pipe and projecting downwardly through the lower end thereof, the lower end of said supply pipe forming an annular passage about said guide rod, a second flange secured about the lower end of said guide rod, a sleeve of elastic material attached at its opposite ends to said first and second flanges to form an expandable enclosure about said supply pipe and guide rod, and a removable air valve fitted to the upper end of said conductor pipe, the said air valve permitting the flow of pneumatic pressure fluid through said conductor pipe and supply pipe and into said expandable enclosure, the said one-way valve being movable axially to exhaust the said expandable enclosure when the said air valve is removed from the said conductor pipe.

2. An inflatable expansion plug as set forth in claim 1, wherein said guide rod is threaded at its upper end within said supply pipe and receives a nut, and said supply pipe is crimped at its lower end to be engageable with said nut.

3. An inflatable expansion plug as set forth in claim 1, wherein said second flange is provided with a downwardly facing conical tip.

4. An inflatable expansion plug as set forth in claim 1, wherein the said one-way valve includes a sleeve threaded at both ends to receive the said conductor pipe and the supply pipe and the valve is located between the opposing ends of the two pipes and a spring holds the said valve to seal the said conductor pipe from the supply pipe.

5. An inflatable expansion plug as set forth in claim 1, in which the first mentioned one-way valve is opened by a weight insertable in said conductor pipe when the said second one-way valve is removed.

References Cited in the file of this patent

UNITED STATES PATENTS

| | | |
|---|---|---|
| 1,547,240 | Steele | July 28, 1925 |
| 2,196,658 | Burt | Apr. 9, 1940 |
| 2,231,282 | Norris | Feb. 11, 1941 |
| 2,342,884 | Moore | Feb. 29, 1944 |
| 2,568,944 | Brigham | Sept. 25, 1951 |
| 2,637,401 | Ramsey | May 5, 1953 |